(12) United States Patent
Nakaya (10) Patent No.: US 8,887,601 B2
(45) Date of Patent: Nov. 18, 2014

(54) MACHINE TOOL

(75) Inventor: Takaichi Nakaya, Nagano (JP)

(73) Assignees: Citizen Holdings Co., Ltd., Tokyo (JP);
Citizen Machinery Miyano Co., Ltd.,
Nagano (JP)

( * ) Notice: Subject to any disclaimer, the term of this patent is extended or adjusted under 35 U.S.C. 154(b) by 140 days.

(21) Appl. No.: 13/635,496

(22) PCT Filed: Feb. 28, 2011

(86) PCT No.: PCT/JP2011/054455
§ 371 (c)(1),
(2), (4) Date: Sep. 17, 2012

(87) PCT Pub. No.: WO2011/114869
PCT Pub. Date: Sep. 22, 2011

(65) Prior Publication Data
US 2013/0008291 A1 Jan. 10, 2013

(30) Foreign Application Priority Data
Mar. 18, 2010 (JP) .................................. 2010-062791

(51) Int. Cl.
| | | |
|---|---|---|
| B23B 1/00 | (2006.01) | |
| B23B 3/30 | (2006.01) | |
| B23B 9/02 | (2006.01) | |
| B23Q 39/02 | (2006.01) | |
| B23B 13/12 | (2006.01) | |
| B23Q 39/00 | (2006.01) | |

(52) U.S. Cl.
CPC ... *B23B 3/30* (2013.01); *B23B 9/02* (2013.01);
*B23Q 2230/006* (2013.01); *B23Q 39/027*
(2013.01); *B23Q 2039/008* (2013.01)
USPC .............................................. 82/155; 82/162

(58) Field of Classification Search
CPC .............. B23B 7/04; B23B 7/06; B23Q 5/22;
B23Q 5/34
USPC ................................ 82/152, 155, 162
See application file for complete search history.

(56) References Cited

U.S. PATENT DOCUMENTS

| | | | | | |
|---|---|---|---|---|---|
| 2,922,656 | A | * | 1/1960 | Belloli | ......................... 279/46.3 |
| 3,225,631 | A | * | 12/1965 | Hermann | ........................ 82/164 |

(Continued)

FOREIGN PATENT DOCUMENTS

| | | |
|---|---|---|
| EP | 03171450 | 6/1990 |
| EP | 0888840 A1 | 1/1998 |

(Continued)

*Primary Examiner* — Will Fridie, Jr.
(74) *Attorney, Agent, or Firm* — Howson & Howson LLP (57) ABSTRACT

There is provided a machine tool capable of working a workpiece regardless whether it is gripped by a front spindle or a back spindle while guiding a free end side thereof by one guide bushing (160), is simplify and compacted and suppresses an increase of a number of axes to be controlled. The machine tool comprises the front and back spindles (112) and (122) having one and same axial line and disposed opposite each other and a guide bushing (160) having an axial line identical with the axial line. The guide bushing (160) is disposed between the front and back spindles (112) and (122), is configured so that the guide bushing (160) can guide the workpiece on both ends of the workpiece (W), so that the workpiece gripped either by the front spindle (112) or the back spindle (122) can be inserted, and so that the guide bushing (160) is movable in an axial direction.

5 Claims, 9 Drawing Sheets

(56) References Cited

U.S. PATENT DOCUMENTS

| | | | | |
|---|---|---|---|---|
| 3,750,499 | A * | 8/1973 | Peasley | 82/164 |
| 3,876,214 | A * | 4/1975 | Blanchard | 279/156 |
| 5,014,580 | A * | 5/1991 | Porter | 82/164 |
| 5,222,421 | A * | 6/1993 | Ushiro | 82/164 |
| 5,381,213 | A * | 1/1995 | Michlin | 399/109 |
| 5,615,590 | A * | 4/1997 | Speckhahn | 82/162 |
| 7,836,803 | B2 * | 11/2010 | McGlasson et al. | 82/155 |
| 8,464,618 | B2 * | 6/2013 | Kanaya et al. | 82/1.11 |
| 2010/0083800 | A1 * | 4/2010 | Kanaya et al. | 82/1.11 |

FOREIGN PATENT DOCUMENTS

| | | |
|---|---|---|
| EP | 1520657 A1 | 4/2005 |
| EP | 1726387 A1 | 11/2006 |
| JP | 62199303 | 3/1987 |
| JP | 07136806 | 5/1995 |
| JP | 09225703 | 2/1997 |
| JP | 2008296331 | 12/2008 |

* cited by examiner

MACHINE TOOL

TECHNOLOGICAL FIELD

The present invention relates to a machine tool including front and back spindles having one and same axial line and disposed opposite each other and tool posts for supporting tools used for machining a workpiece to machine the workpiece into a desired shape.

BACKGROUND ART

Hitherto, there is used a machine tool having front and back spindles having one and same axial line and disposed opposite each other to machine a workpiece sequentially from front and back sides while passing the workpiece between the spindles in implementing a multi-step work to one workpiece. Then, there is known a machine tool configured to suppress vibrations and deflections to machine in high precision by providing guide bushings having same axial lines respectively to the respective spindles to support a vicinity of machining position of the workpiece held by the spindles by the guide bushings (see Patent Literature 1).

There is also known a machine tool configured to suppress vibrations and deflections to machine in high precision by making a guide bushing and a tool post to be movable integrally in an axial direction (Z-axis direction) of the spindle to support a vicinity of machining position by the guide bushing while moving the tool post in the Z-axis direction (see Patent Literature 2).

CITATION LIST

Patent Literature

Patent Literature 1: Japanese Patent Application Laid-open No. Hei. 2-152701 (all pages, all drawings) Patent Literature 2: Japanese Patent Application Laid-open No. 2008-238374 (all pages, all drawings)

DISCLOSURE OF THE INVENTION

Technical Problem

However, the machine tool as described in the Patent Document 1 has a problem that the machine tool is relatively enlarged because the guide bushings are required respectively for the front and back spindles. The machine tool as described in the Patent Document 2 has a problem that because the machine tool has no back spindle, it is unable to machine a workpiece while passing between both spindles and while guiding front and back sides by the guide bushing.

Solution to Problems

In order to solve the aforementioned problems, according to a first aspect of the invention, there is provided a machine tool comprising front and back spindles having one and same axial line and disposed opposite each other, a guide bushing having an axial line aligned with the axial line of the spindles, and a tool post for supporting tools used for machining a workpiece, wherein the guide bushing is disposed between the front and back spindles and wherein the guide bushing is configured so that the guide bushing can guide the workpiece on both ends of the workpiece, so that the workpiece gripped either by the front spindle or the back spindle can be inserted through the guide bushing, and so that the guide bushing is movable in an axial direction.

According to a second aspect of the invention, the tool post is configured to be movable in synchronism with the move of the guide bushing in the axial direction of the front spindle, in addition to the configuration of the machine tool described above.

According to a third aspect of the invention, the guide bushing is configured so as to be able to solely hold the workpiece in a state in which the workpiece is withdrawn from the front and back spindles, in addition to the configuration of the machine tool described above.

According to a fourth aspect of the invention, the guide bushing is configured to be held by a guide bushing fulcrum and to be removable from the guide bushing fulcrum, in addition to the configuration of the machine tool described above.

According to a fifth aspect of the invention, the guide bushing fulcrum is configured so that the guide bushing fulcrum can be stored in the front spindle or the back spindle side in a state in which the guide bushing is removed out of the guide bushing fulcrum, in addition to the configuration of the machine tool described above.

Advantageous Effects of the Invention

According to the first aspect of the machine tool of the invention, the workpiece gripped either by the front spindle or the back spindle can be machined while guiding an free end side thereof by one guide bushing, so that it is possible to simplify and compact the machine tool and to suppress an increase of a number of axes to be controlled.

According to the second aspect of the machine tool of the invention, it is possible to support the vicinity of the machining position by the guide bushing and to machine in high precision by suppressing vibrations and deflection in machining an distal end of the workpiece held either by the front spindle or the back spindle, in addition to the effects brought about by the machine tool of the invention as described above. Still further, the tool post may be used for the both front and back spindles.

According to the third aspect of the machine tool of the invention, it is possible to pass the workpiece between the front and back spindles without moving the spindles whose weight is heavy and by moving the guide bushing whose weight is light, in addition to the effects brought about by the machine tool of the invention as described above. Accordingly, it is possible to increase moving speed of the workpiece and to shorten an overall machining time.

According to the fourth and fifth aspects of the machine tool of the invention, it is possible to pass and machine the workpiece without being hindered by the guide bushing and the guide bushing fulcrum, regardless whether the workpiece is held by the front spindle or the back spindle, in machining the workpiece which is short in the X-axis direction, in addition to the effects brought about by the machine tool of the invention as described above.

BEST MODE FOR CARRYING OUT THE INVENTION

Embodiment

Figure 1:
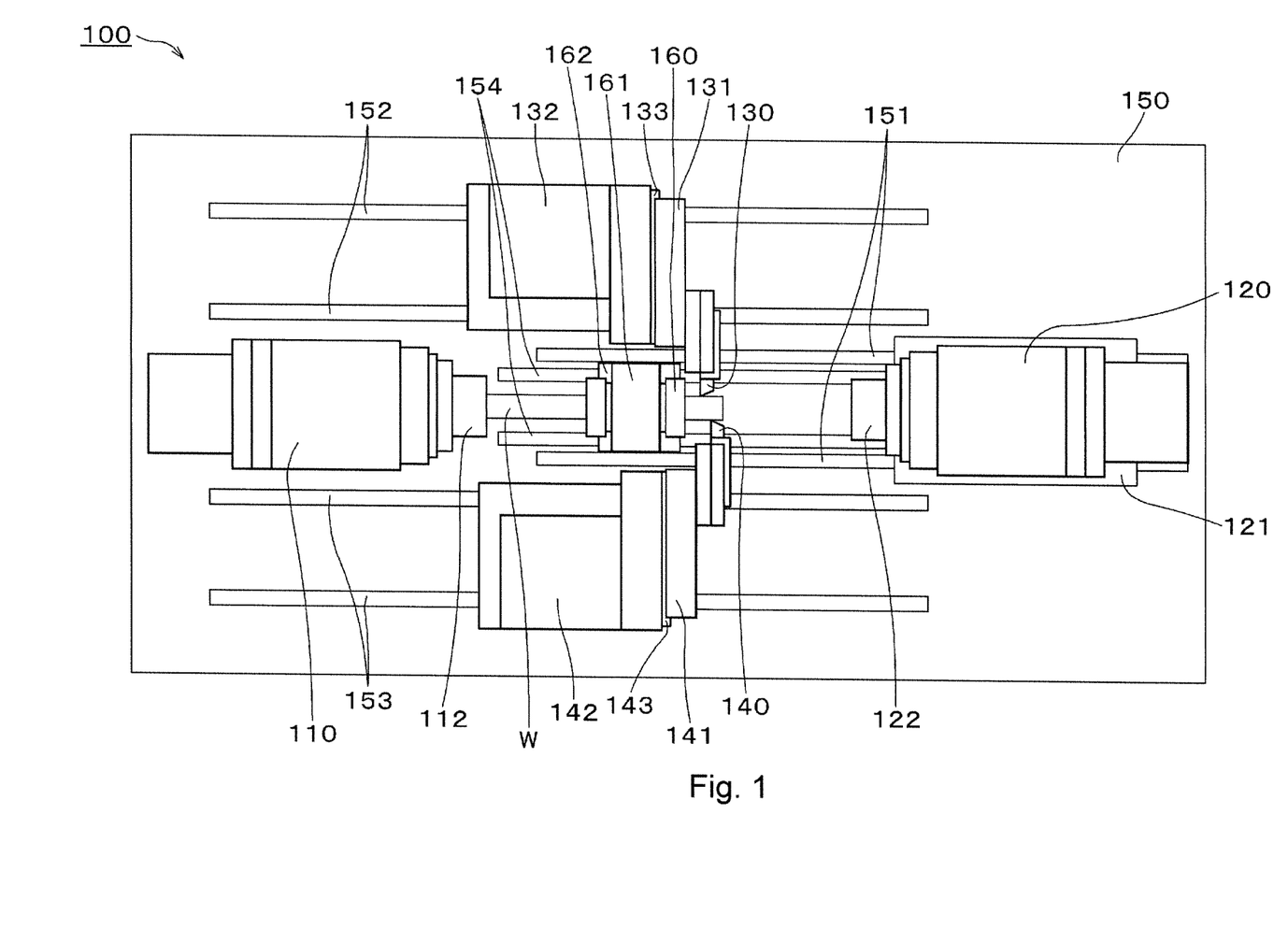
FIG. 1 is a plan view of a machine tool of one embodiment of the invention in carrying out front machining.

As shown in FIG. 1, a machine tool 100 of one embodiment of the invention has, on its base 150, a front spindle 112, a back spindle 122, a first tool post 131 for holding a working tool 130, a second tool post 141 for holding a working tool 140, and a guide bushing fulcrum 161 for removably holding a guide bushing 160. The front spindle 112 grips a workpiece W at its distal end and is supported rotatably and drivably by a front headstock 110. The front headstock 110 is fixed to the base 150.

The back spindle 122 is supported rotatably and drivably by a back headstock 120 and is disposed opposite the front spindle 112 with one and same axial line. The back spindle 122 can grip the workpiece W at its distal end similarly to the front spindle 112. The back headstock 120 is mounted on a back headstock carrier 121 that is slidably supported on a back spindle Z-axis rail 151 provided on the base 150 so that its position in an axial direction (Z-axis direction) can be controlled by a driving unit not shown.

The first and second tool posts 131 and 141 are disposed on both sides of the axial line of the front spindle 112. The first tool post 131 is supported slidably on a first tool post X-axis rail 133 provided on a first tool post supporting table 132 so that its position in an X-axis direction orthogonal to the axial line in a lateral direction by a driving unit not shown. The first tool post supporting table 132 is supported slidably on a first tool post Z-axis rail 152 provided on the base 150 so that its position in the Z-axis direction can be controlled by a driving unit not shown.

The second tool post 141 is supported slidably on a second tool post X-axis rail 143 provided on a second tool post supporting table 142 so that its position in the X-axis direction by a driving unit not shown. The second tool post supporting table 142 is supported slidably on a second tool post Z-axis rail 153 provided on the base 150 so that its position in the Z-axis direction can be controlled by a driving unit not shown. It is noted that the first and second tool posts 131 and 141 can be configured to hold pluralities of working tools 130 and 140 through tool replacing mechanisms, respectively, so that the tools can be appropriately selected corresponding to types of works.

The guide bushing 160 is held removably by the guide bushing fulcrum 161, and the guide bushing fulcrum 161 is mounted on a guide bushing carrier 162 supported slidably on a guide bushing Z-axis rail 154 provided on the base 150 so that its position in the Z-axis direction can be controlled by a driving unit not shown. The guide bushing 160 is disposed so as to have a same spindle axis with the front and back spindles 112 and 122 and is configured so that the workpiece W can be inserted through the guide bushing from either ends of the front spindle 112 and the back spindle 122 and so that the guide bushing can support (guide) the workpiece W by the end on an opposite side from which the workpiece W is inserted.

The guide bushing 160 is an openable guide bushing having collet chucks respectively on the both front and back spindle sides in the present embodiment. Therefore, the guide bushing 160 can grip the workpiece W inserted therethrough in a closed state in which at least one collet chuck is closed and can guide the workpiece W inserted therethrough while permitting the workpiece W to move in the spindle axis direction in an open state in which the both collet chucks are adjusted to openings corresponding to size of the material.

Figure 8:
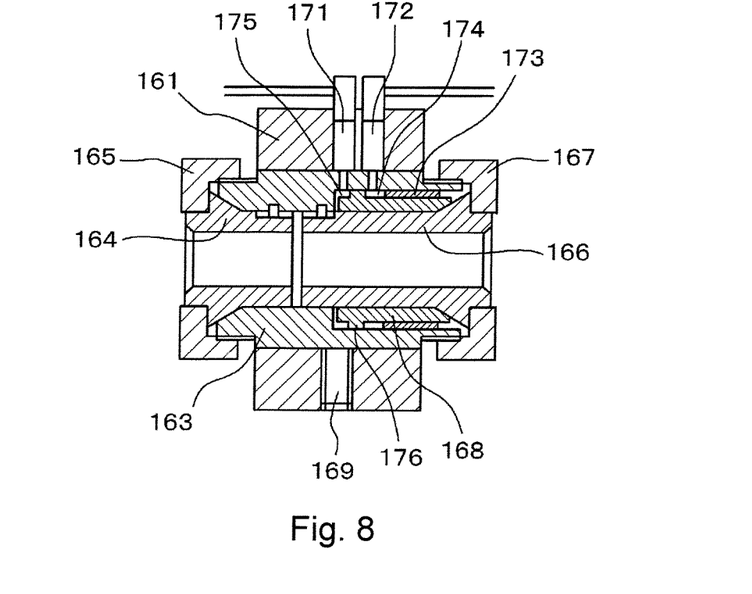
FIG. 8 is a section view of the guide bushing fulcrum and the guide bushing.

As shown in FIG. 8, the guide bushing 160 of the present embodiment includes a chuck sleeve 163, a front-side collet chuck 164, a front-side cap nut 165, a back-side cap nut 167 and a slide sleeve 168. The guide bushing 160 is configured to insert the front-side collet chuck 164 and the back-side collet chuck 166 into both ends of the chuck sleeve 163 and so that an inner diameter thereof is adjustable by a tapered surface of the chuck sleeve 163 or the slide sleeve 168 by rotating the front-side cap nut 165 and the back-side cap nut 167. The slide sleeve 168 is inserted into the guide bushing fulcrum 161 and is fixed by the fixing screw 169.

The slide sleeve 168 is internally attached to the chuck sleeve 163 slidably by fluid pressure. The slide sleeve 168 slides through an intermediary of a ring 173 fixedly and internally attached to the chuck sleeve 163. The slide sleeve 168 also has a projection 176 that directly slides against the chuck sleeve 163, and forms a loosening-side fluid chamber 174 surrounded by a projecting-side side surface of the projection 176, the ring 173 and the chuck sleeve 163 and a loosening-side fluid chamber 174 surrounded by an opposite-side side surface of the projection 176 and the chuck sleeve 163. The slide sleeve 168 can actuate and open/close the back-side cap nut 167 by sliding by introducing fluid pressure in the respective fluid chambers through fastening and loosening fluid pressure ports 171 and 172 provided in the guide bushing fulcrum 161.

In supporting the workpiece W in carrying out the front and back machining, the back-side cap nut 167 and the front-side cap nut 165 are rotated to adjust the collet chucks to have optimum inner diameter corresponding to a diameter of the workpiece W. In gripping the workpiece W, the fluid pressure is introduced into the fastening-side fluid port 171 to slide the slide sleeve 168 and to grip the workpiece W by the back-side cap nut 167.

With this arrangement, it is possible to insert the workpiece W gripped by the front spindle 112 through the guide bushing 160 and to work an edge protruding from the guide bushing 160 by the working tool 130 or 140. It is possible to always work the vicinity of the machining position and to machine in high precision while guiding by the guide bushing 160 and while suppressing vibrations and deflections by moving the guide bushing 160 also in the Z-axis direction in synchronism with the working tool in machining the workpiece W by moving the working tool 130 or 140 in the Z-axis direction. Still further, the first tool post 131 and the second tool post 141 can be used in carrying out the front and back machining.

Figure 2:
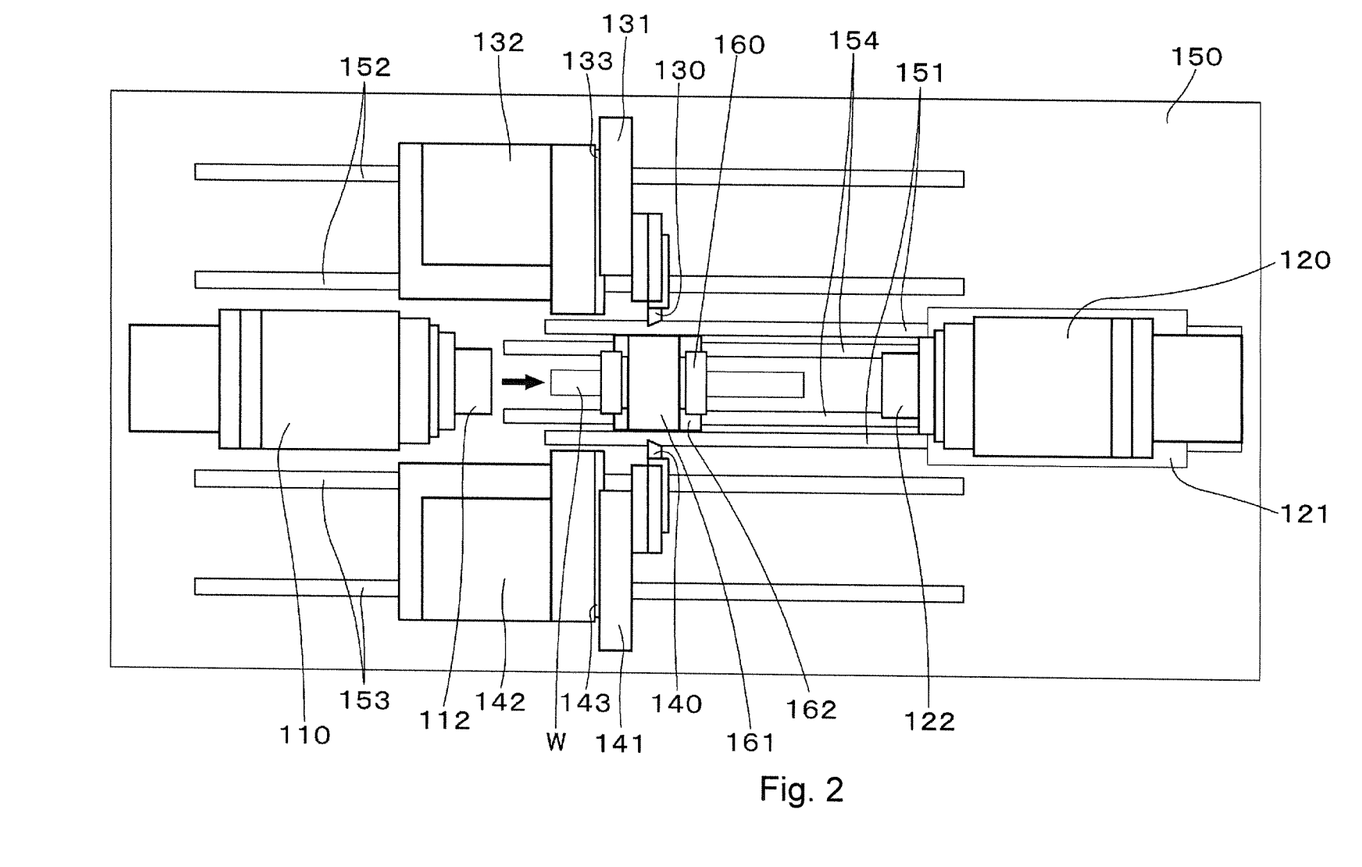
FIG. 2 is a plan view of the machine tool of one embodiment of the invention in passing a workpiece.
Figure 3:
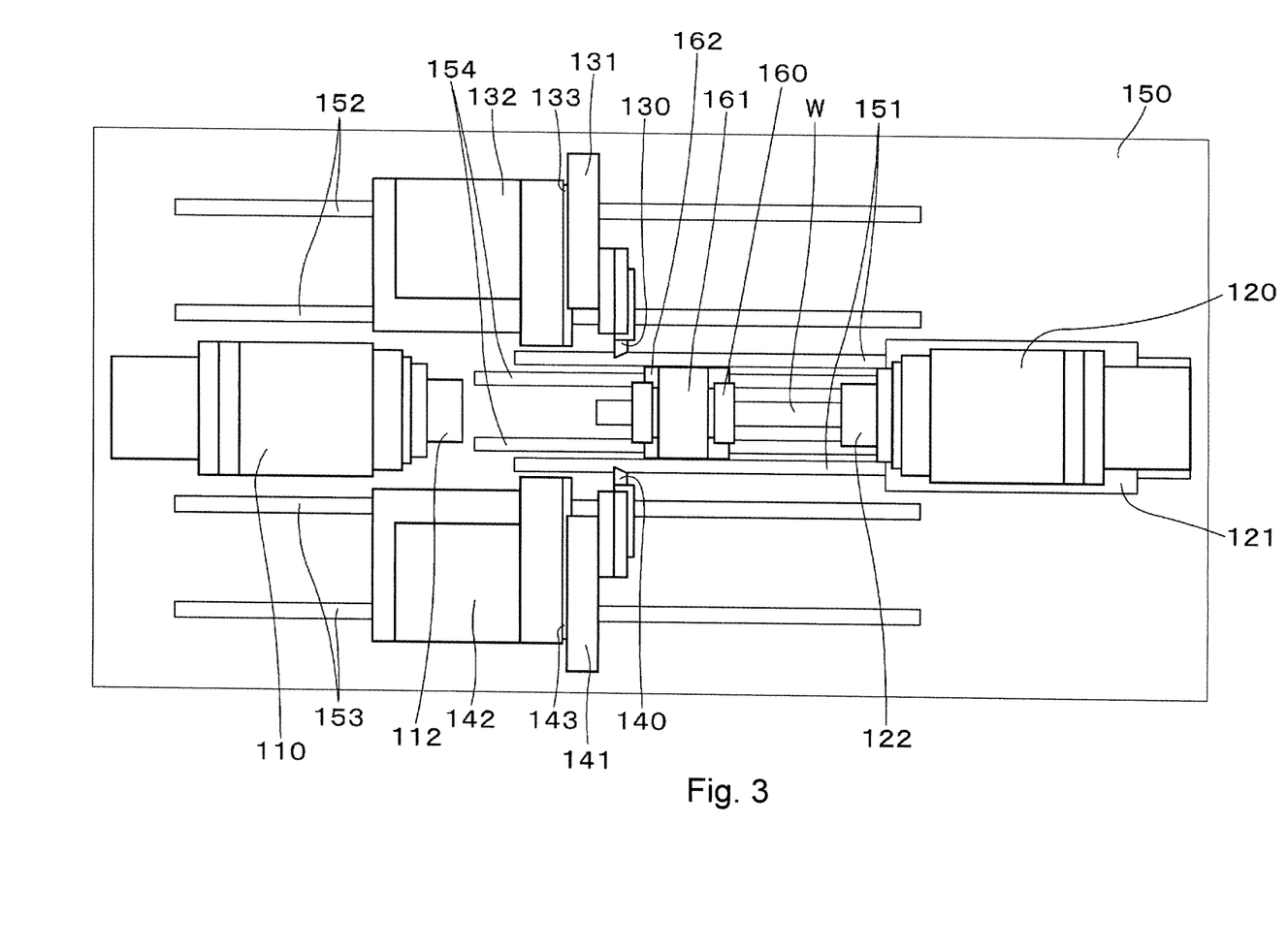
FIG. 3 is a plan view of the machine tool of one embodiment of the invention in carrying out back machining.

Next, an operation in passing the workpiece W from the front spindle 112 to the back spindle 122 will be explained. When the work in the state shown in FIG. 1 completes, the guide bushing 160 moves to appropriate position of the workpiece W to release the grip of the workpiece W by the front spindle 112 in the state in which the guide bushing 160 is closed. Then, the guide bushing 160 moves to the back spindle 122 side in the Z-axis direction while holding the workpiece W as shown in FIG. 2 to position where the end of the workpiece W machined first can be gripped by the back spindle 122 as shown in FIG. 3. The workpiece W is passed to the back spindle 122 as the workpiece W is gripped by the back spindle 122 in the state in which the guide bushing 160 is opened. Thereby, it is possible to machining position on the opposite side of the workpiece W protruding from the guide bushing 160.

Because the workpiece W passed to the back spindle 122 is inserted through the guide bushing 160, it is possible to always work a vicinity of machining position while guiding by the guide bushing 160 and to machine in high precision while suppressing vibrations and deflections also in carrying out the back machining by moving the working tool 131 or 141 in synchronism with the guide bushing 160 in the Z-axis direction and by moving the back spindle 122 in the Z-axis direction while fixing the position of the guide bushing 160. In this case, the working tool 131 or 141 is moved to position opposing the back spindle 122 while interposing the guide bushing 160 between them.

It is noted that it is possible to pass the workpiece W between the front spindle 112 and the back spindle 122 by gripping the end of the workpiece W protruding from the guide bushing by the back spindle 122 by moving the back spindle 122 in the Z-axis direction while keeping the open state of the guide bushing 160. It is possible to machine the workpiece W while guiding by the guide bushing 160 on the side of the back spindle 122 in the same manner as described above by moving the guide bushing 160 in the Z-axis direction as necessary so that the state in which the workpiece W is guided by the guide bushing 160 is kept or so that the workpiece W gripped by the back spindle 122 is inserted through the guide bushing 160 also in this case.

It is noted that the guide bushing 160 is not always necessary to be the open/closed type guide bushing when the guide bushing 160 is not used as a conveying means. For instance, it is also possible to use a guide bushing provided with a through hole of a size corresponding to a workpiece to be machined.

It is possible to accommodate to the front and back machining by one guide bushing 160 by arranging so that the guide bushing 160 is movable in the Z-axis direction as described above. Still further, it is possible to pass the workpiece W between the front spindle 112 and the back spindle 122 by using the guide bushing 160 as the conveying means by configuring the guide bushing 160 as the open/close type guide bushing, like the present embodiment. Thus, it is possible to reduce a number of components and to suppress an increase of number of axes to be controlled.

Figure 4:
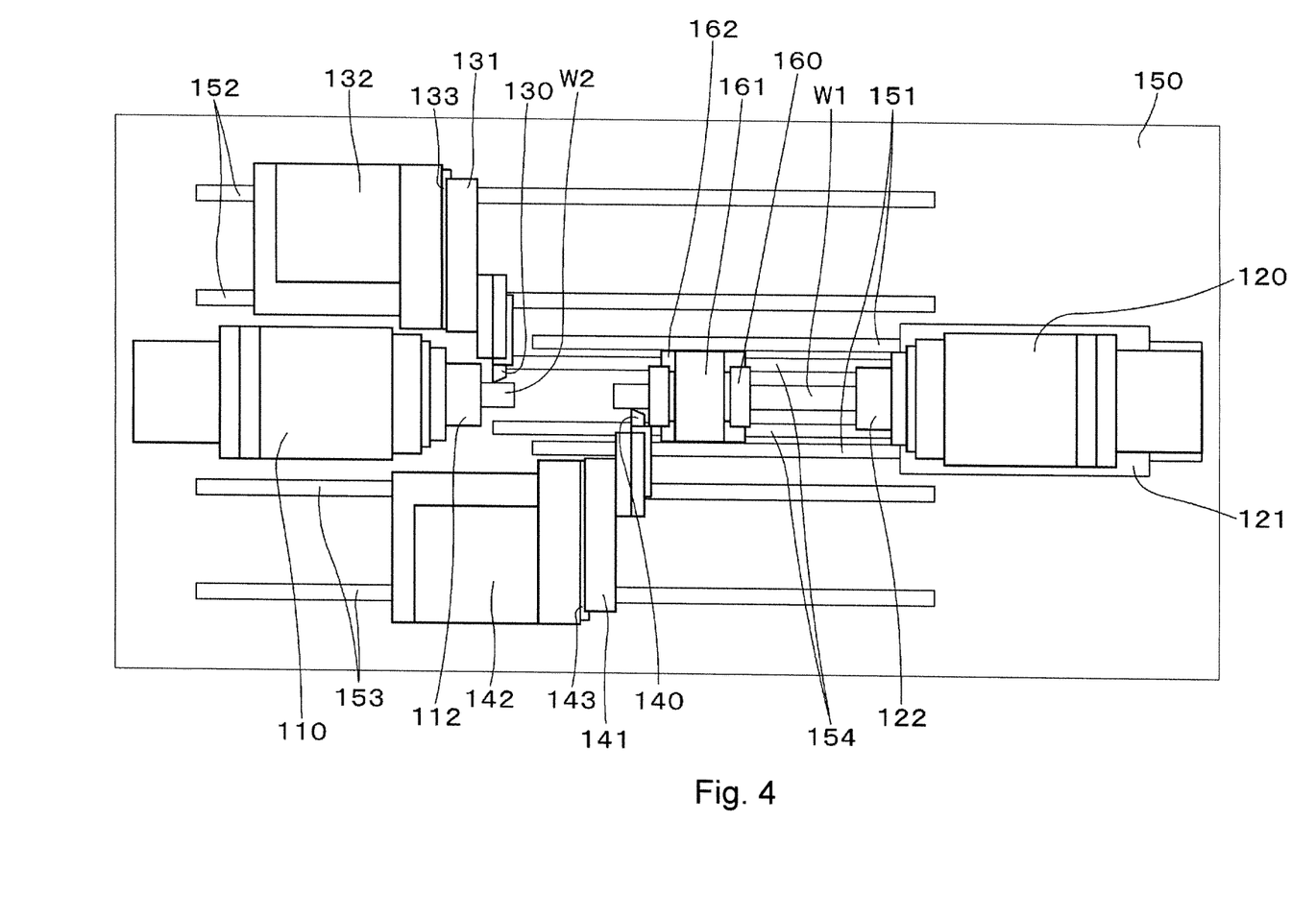
FIG. 4 is a plan view of the machine tool of one embodiment of the invention in carrying out the front and back machining simultaneously.

Still further, as shown in FIG. 4, it is possible to machine another workpiece W2 gripped by the front spindle 112 by the working tool 130 held by the first tool post 131 while working the workpiece W1 gripped by the back spindle 122 by the working tool 140 held by the second tool post 141 while guiding by the guide bushing 160. In this case, however, the workpiece W2 is machined without being supported by the guide bushing on the side of the front spindle 112 (non-guide bushing work). Thereby, it is possible to shorten an overall machining time in machining a plurality of workpieces.

Figure 5:
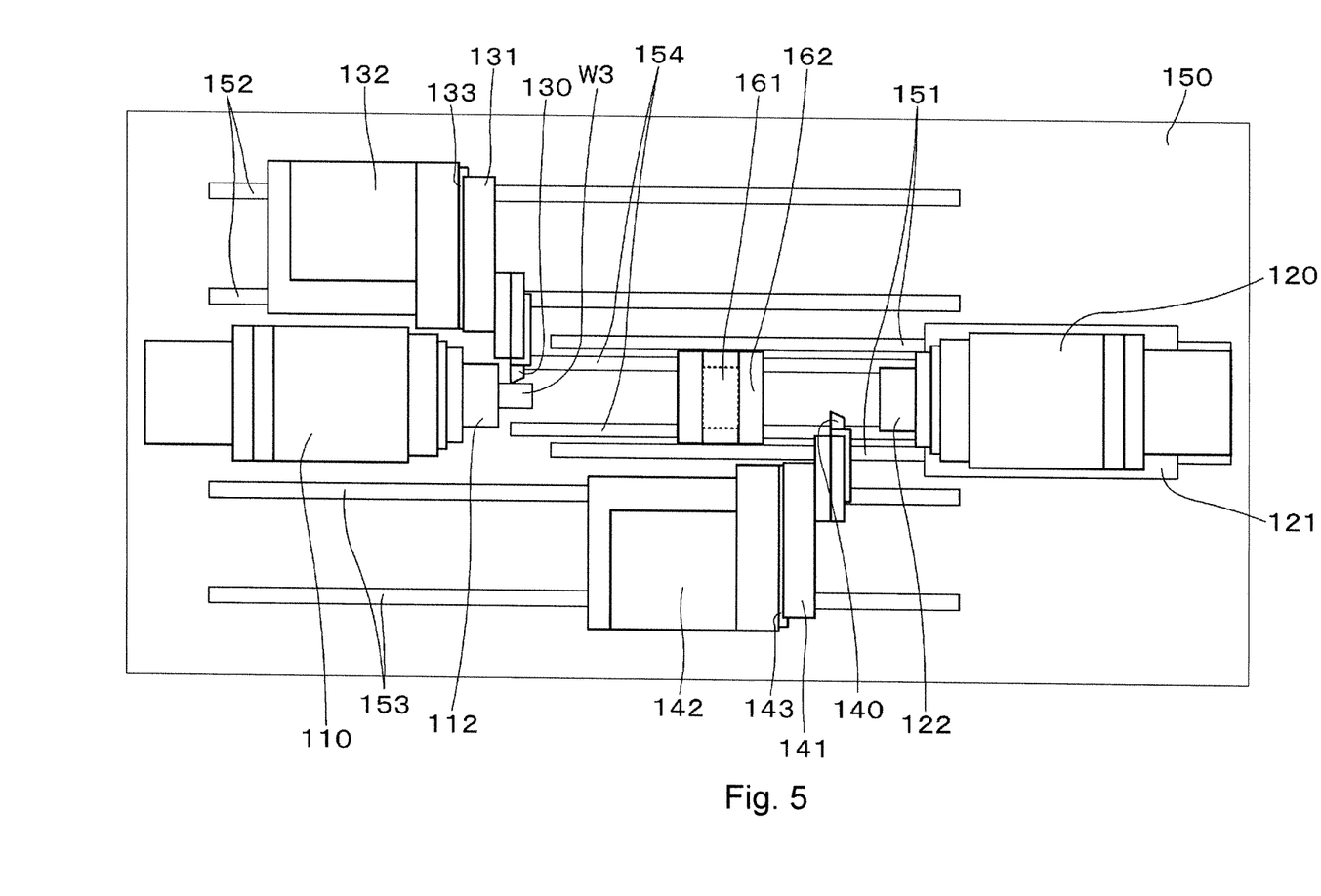
FIG. 5 is a plan view of the machine tool of one embodiment of the invention when a guide bushing is removed.
Figure 9:
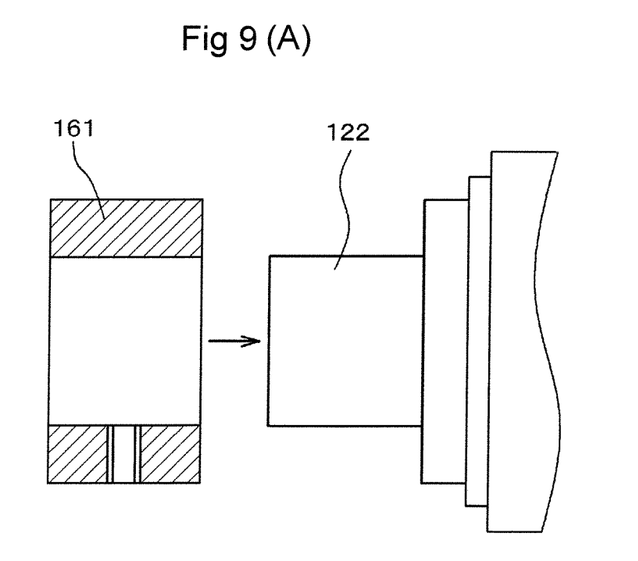
FIG. 9 illustrates how the guide bushing fulcrum is stored in the spindle.

It is noted that when the non-guide bushing work is carried out on the both spindles 112 and 122 for example, it is possible to use the machine tool by removing the guide bushing 160 from the guide bushing fulcrum 161 as shown in FIG. 5. Specifically, it is possible to remove the guide bushing 160 from the guide bushing fulcrum 161 as shown in FIG. 9A by loosening the fixing screw 169 of the guide bushing fulcrum 161 and by removing the front-side cap nut 165 or the back-side cap nut 167. The guide bushing fulcrum 161 from which the guide bushing 160 is removed can be accommodated in the back spindle 122 side so that the guide bushing fulcrum 161 does not hinder the work as shown in FIG. 9B by forming the guide bushing fulcrum 161 so that the back spindle 122 is inserted into a space from which the guide bushing 160 has been removed.

Figure 6:
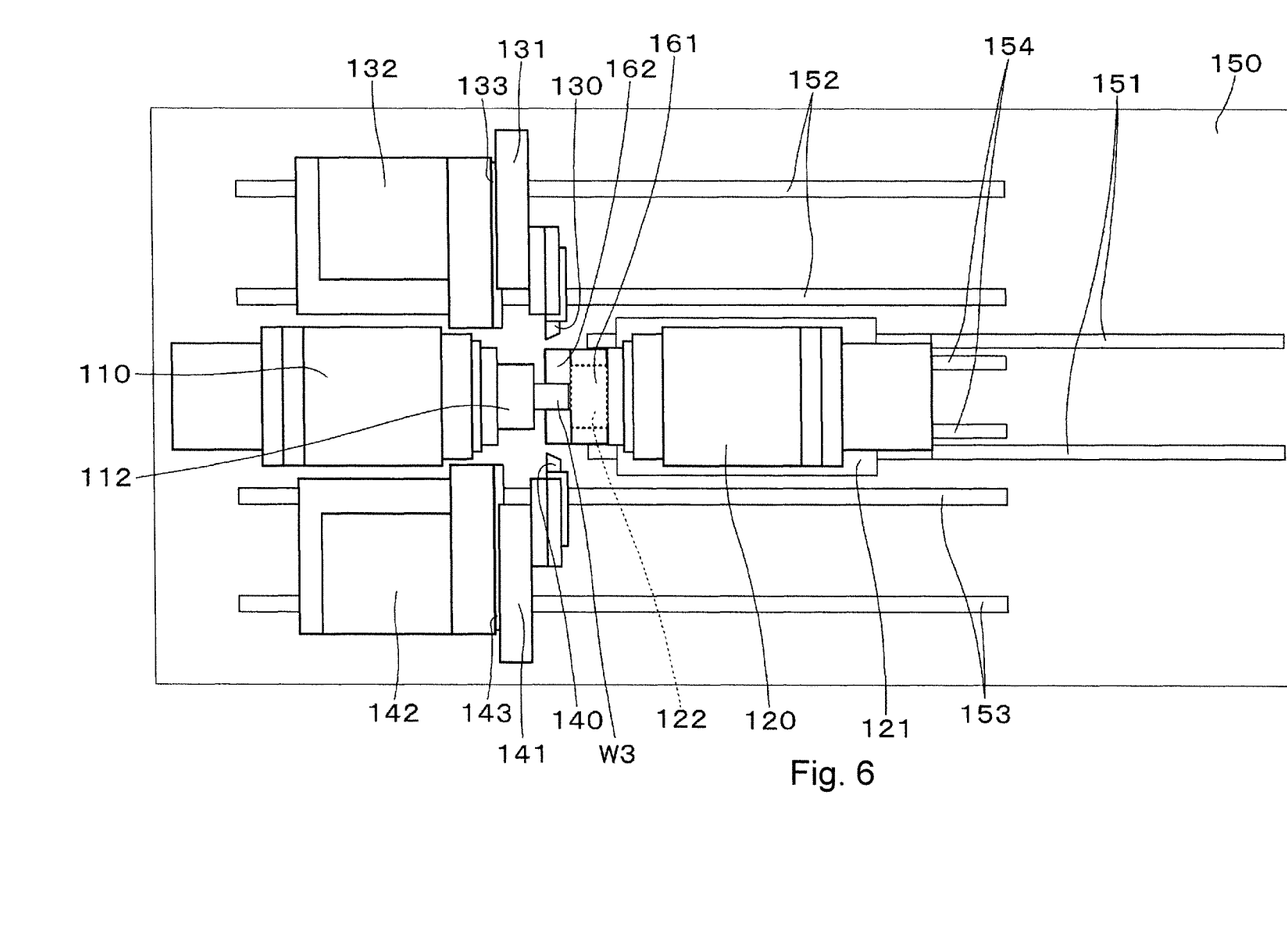
FIG. 6 is a plan view of the machine tool of one embodiment of the invention in passing the workpiece while storing a guide bushing fulcrum.

An operation of work in a state not using the guide bushing 160 will be explained below. When the front machining shown in FIG. 5 is completed, the working tools 130 and 140 of the first and second tool posts 131 and 141 set back as shown in FIG. 6. Then, the workpiece W3 can be passed between the front spindle 112 and the back spindle 122 by moving the back spindle 122 and the guide bushing fulcrum 161 to the front spindle 112 side in synchronism so that the state in which the back spindle 122 stores the guide bushing fulcrum 161 is kept, by approaching the workpiece W3 held by the front spindle 112 to position where the back spindle 122 can hold from the opposite side, and by releasing the workpiece W3 from the front spindle 112 so that the back spindle 122 grips the workpiece W3.

Figure 7:
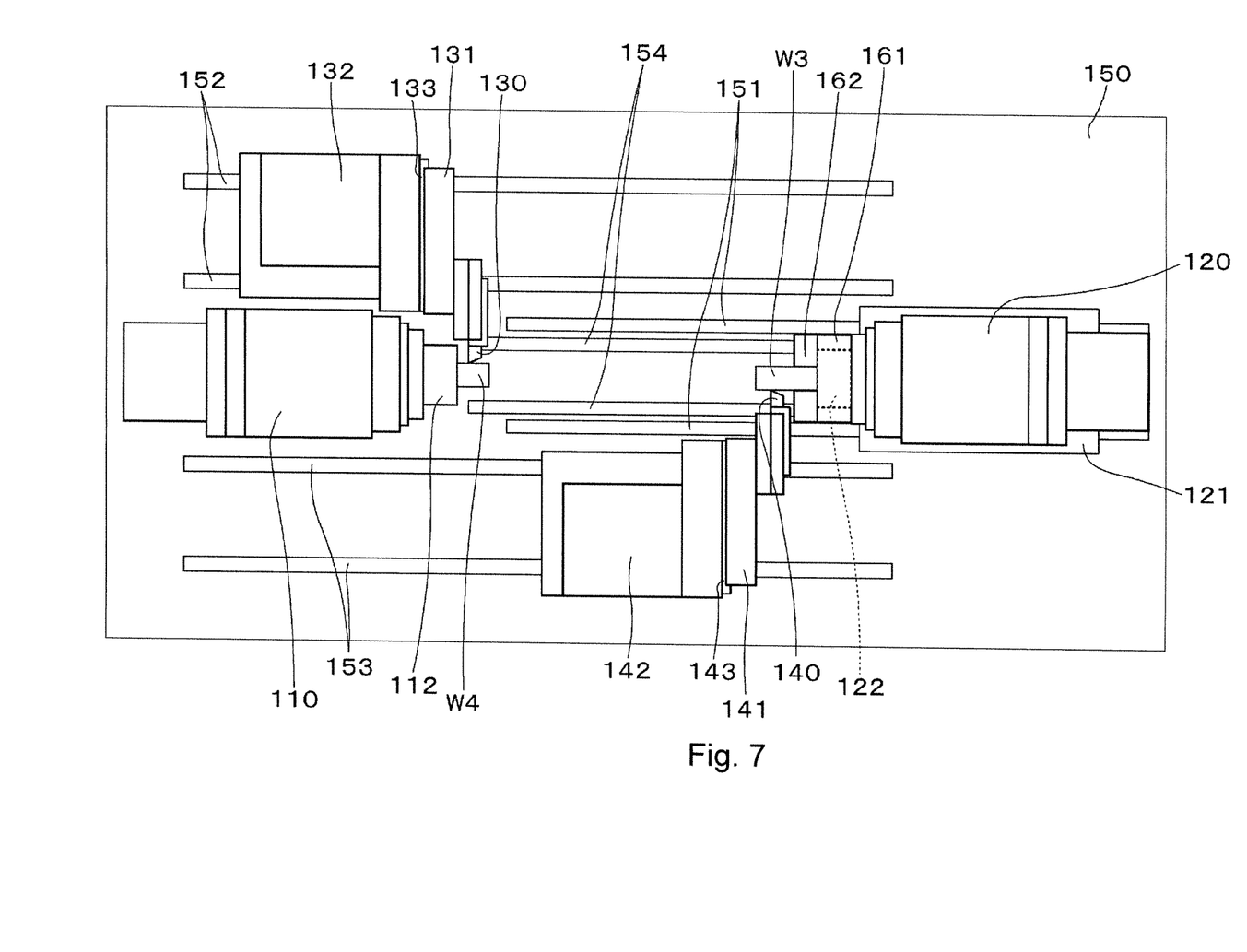
FIG. 7 is a plan view of the machine tool of one embodiment of the invention in carrying out the front and back machining simultaneously while storing the guide bushing fulcrum.

Then, it is possible to carry out the back machining of the w3 by the working tool 140 of the second tool post 141 by moving the back spindle 122 and the guide bushing fulcrum 161 in synchronism so that the back spindle 122 stores the guide bushing fulcrum 161 as shown in FIG. 7. It is possible to shorten an overall machining time by supplying a next workpiece W4 to the front spindle 112 and by carrying out the front machining of the workpiece W4 by the working tool 130 of the first tool post 131 while carrying out the back machining of the workpiece W3 at this time.

Because the guide bushing 160 is configured to be removable from the guide bushing fulcrum 161 and the guide bushing fulcrum 161 is configured to be stored in the back spindle 122 as described above, the guide bushing 160 and the guide bushing fulcrum 161 do not hinder the works in machining the workpieces W3 and W4 that do not require the guide bushing and such operations as passing the workpiece between the front spindle 112 and the back spindle 122, the front and back machining can be readily carried out. The guide bushing fulcrum 161 can be configured so that it is stored in the front spindle 112 side. In this case, it is not necessary to move the guide bushing fulcrum 161 in synchronism with the back spindle 122, so that the move can be controlled readily.

It is noted that the drawings appended with the present application are simplified to facilitate understanding of the disposition and operations of the components and actual specific shapes and sizes of the individual components are not limited to what shown in the drawings. Still further, although not shown, the machine tool may be provided appropriately with other desirable components used in a machine tool in general such as other machine tools, a workpiece handling mechanism, a working fluid supplying mechanism and a work chip discharging mechanism.

DESCRIPTION OF REFERENCE NUMERALS

100 Machine tool
110 Front headstock
112 Front spindle
120 Back headstock
121 Back headstock carrier 122 Back spindle
130 Working tool
131 First tool post
132 First tool post supporting table
133 First tool post X-axis rail
140 Working tool
141 Second tool post
142 Second tool post supporting table
143 Second tool post X-axis rail
150 Base
151 Back spindle Z-axis rail
152 First tool post Z-axis rail
153 Second tool post Z-axis rail
154 Guide bushing Z-axis rail
160 Guide bushing
161 Guide bushing fulcrum
162 Guide bushing carrier
163 Chuck sleeve
164 Front collet chuck
165 Front-side cap nut
166 Back-side collet chuck
167 Back-side cap nut
168 Slide sleeve
169 Fixing screw
171 Fastening-side fluid port
172 Loosening-side fluid port
173 Ring
174 Loosening-side fluid chamber
175 Fastening-side fluid
176 Projection
W Workpiece

The invention claimed is:

1. A machine tool, comprising:

front and back spindles, said front and back spindles facing each other and being rotatable on a common axis, and each of said front and back spindles being capable of gripping a workpiece, and rotating said workpiece on said common axis;

a guide bushing having an axis aligned with said common axis of the spindles; and at least one tool post for supporting a tool used for machining a workpiece, said at least one tool post being positionable so that tools supported thereby can machine a part of a workpiece extending from said guide bushing toward the front spindle and alternatively machine a part of the workpiece extending from said guide bushing toward the back spindle;

wherein the guide bushing is disposed between the front and back spindles and has a first end facing the front spindle and an opposite end facing the back spindle; and wherein the guide bushing is configured so that the workpiece gripped either by the front spindle or the back spindle can be inserted through the guide bushing, the guide bushing is movable along the direction of said common axis and capable of guiding a part of said workpiece extending from said guide bushing toward said front spindle by said first end of said guide bushing when said workpiece is gripped and rotated by the rear spindle, and said guide bushing is capable of guiding a part of said workpiece extending from said guide bushing toward said rear spindle by said opposite end of said guide bushing when the workpiece is gripped and rotated by the front spindle;

whereby, when a tool supported by one of said at least one tool posts machines the workpiece while the guide bushing is used to guide the workpiece, the guide bushing can be located between the spindle gripping the workpiece and the tool machining the workpiece, and can guide the part of the workpiece extending from said guide bushing on the side of said guide bushing facing the spindle other than the spindle gripping the workpiece.

2. The machine tool according to claim 1, wherein the tool post is configured to be movable in synchronism with the movement of the guide bushing along the direction of said common axis.

3. The machine tool according to claim 1, wherein the guide bushing is configured so as to be able to solely hold the workpiece in a state in which the workpiece is withdrawn from the front and back spindles.

4. The machine tool according to claim 1, wherein the guide bushing is configured to be held by a guide bushing fulcrum and to be removable from the guide bushing fulcrum.

5. The machine tool according claim 4, wherein at least one of said spindles has a cylindrical external surface, and the guide bushing fulcrum has a cylindrical internal surface conforming to and capable of fitting said cylindrical external surface of said at least one of said spindles, whereby the guide bushing fulcrum can be stored on said at least one of said spindles when the guide bushing is removed from the guide bushing fulcrum.

* * * * *